M. J. GREEN.
BROILER.
APPLICATION FILED JAN. 19, 1915.
1,137,130. Patented Apr. 27, 1915.
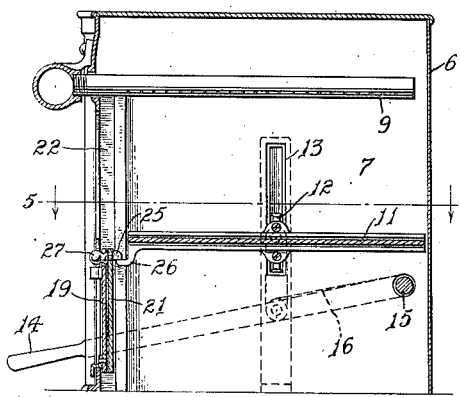
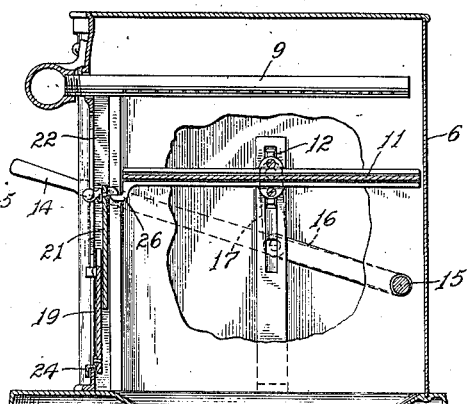
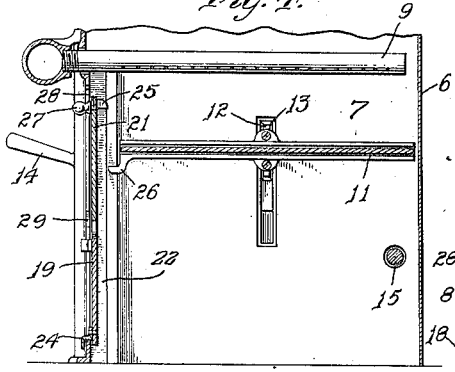
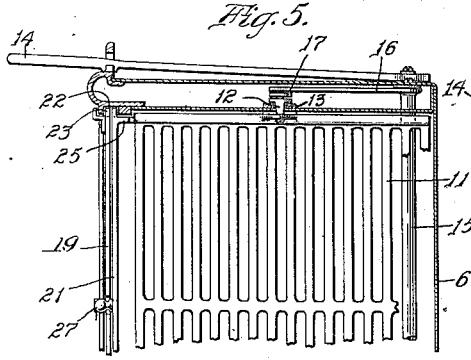
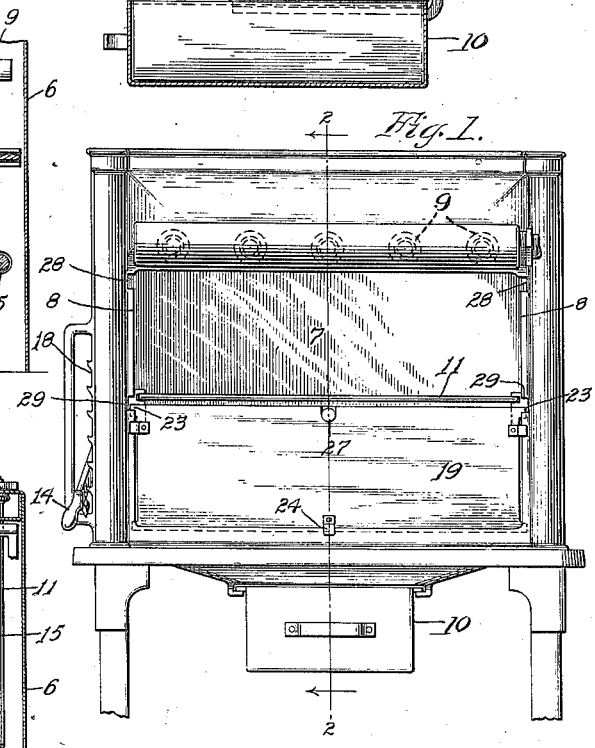

UNITED STATES PATENT OFFICE.

MICHAEL J. GREEN, OF ROCKFORD, ILLINOIS, ASSIGNOR TO ECLIPSE GAS STOVE COMPANY, OF ROCKFORD, ILLINOIS, A CORPORATION OF ILLINOIS.

BROILER.

1,137,130.　　　　　Specification of Letters Patent.　Patented Apr. 27, 1915.

Application filed January 19, 1915. Serial No. 3,101.

*To all whom it may concern:*

Be it known that I, MICHAEL J. GREEN, a citizen of the United States, residing at Rockford, in the county of Winnebago and State of Illinois, have invented certain new and useful Improvements in Broilers, of which the following is a specification.

This invention relates in general to cooking devices and has more particular reference to ovens in which food is cooked by grilling or broiling; ovens of this character being commonly known as broiling ovens.

The embodiment of my invention illustrated in the present case is shown in connection with a broiling oven adapted to be heated by gas burners.

One of the primary objects of my invention is to provide a broiling oven which shall be so constructed that it will retain and utilize a maximum amount of the heat generated in or conducted into the oven. In other words, I aim to provide a broiling oven which may be economically operated under varied conditions of usage.

The use of broiling ovens in restaurants, hotels and other places is quite irregular being at times steady and at other times intermittent. When the service is steady and the oven is used for broiling steaks for instance, it is desirable to have immediate access to the broiling rack to change and attend to the food being broiled. When the service is intermittent, it is desirable to completely close the oven in order that it may be operated most economically. In an oven equipped with a common door which necessitates opening the entire entrance to the oven each time it is desired to gain access thereto during usage, it is obvious that frequent exposure of the oven to free ingress of cold or unheated air will greatly impair the efficiency of the oven.

Another object of my invention therefore, is to provide a broiling oven having heating means arranged in the upper portion thereof and a vertically adjustable broiling rack or grid, with means for preventing unheated air from entering the oven below the broiling rack without obstructing access to the oven above the broiling rack.

Another object is to provide means for maintaining the entire entrance opening to the oven below the broiling rack closed during raising and lowering of the rack, while leaving the entire entrance above the rack open.

A further object of my invention is to provide a collapsible closure for the entrance opening to a broiling oven, movable with the broiling rack as the same is raised and lowered, and to so construct the same that the sections may be easily detached from the oven when it is desired to clean the interior thereof.

Other advantages of the invention will be apparent as the invention becomes better understood by reference to the following description when considered in connection with the accompanying drawings, wherein:

Figure 1 is a face view of a broiling oven embodying my invention, the broiling rack of the oven being shown in lowered position; Fig. 2 is a vertical sectional view through Fig. 1 taken on the line 2—2 of Fig. 1; Fig. 3 is a sectional view similar to Fig. 2 but showing the broiling rack in raised position; Fig. 4 is a similar sectional view, but showing the closure positioned to completely close the oven entrance opening; and Fig. 5 is a plan sectional view taken on the line 5—5 of Fig. 2.

In the drawings I have illustrated only so much of a broiling oven as is necessary for an understanding of my invention, it being obvious that various forms of oven casings might be used and that the oven might be either embodied in a gas stove or range or be built as a separate cooking device.

The casing or shell designated by the reference character 6, forms the oven 7 and is provided at its front side with a rectangular entrance opening 8 extending from top to bottom of the oven and through which access to the oven may be had. The oven is heated by gas burners 9 of any suitable or preferred construction, arranged to extend across the upper portion of the oven. A drip pan 10 is removably supported beneath the oven to catch and retain the grease which drips from meat being broiled in the upper portion of the oven.

A perforated broiling rack or grid 11 disposed within and extending horizontally across the oven is mounted at opposite sides thereof on slides 12 which are guided in vertical ways 13 to permit the broiling rack to be moved vertically in the oven. The particular mechanism for raising and lowering the broiling rack forms no part of the present invention, and any preferred form of such means may be used. For the purpose of illustration I have shown in the drawings one practical means for the purpose comprising a manually operable lever 14 pivoted to one side of the oven by a rock-shaft 15, and connections between the shaft and both sides of the broiling rack. The said connections each comprise an arm 16 fixed to the rock-shaft and a link 17 connecting the arm and the slide 12. It is obvious that by swinging the lever vertically the broiling rack may be moved into and out of proximity to the burners 9; and to hold the broiling rack in any set position, the lever may be engaged with a notched face 18 located adjacent the outer end of the lever.

The means for closing the oven opening comprises a pair of imperforate slidable plates or closures 19 and 21 extending across the oven opening and slidably mounted in vertical grooves or ways 22 in the casing. The length of the plates or closures is a trifle less than the width of the opening to the oven as is clearly shown in Fig. 1, and the closures are each provided at the upper and lower edges of their ends with lugs 23 located in the grooves 22 to hold the closures against displacement while permitting them to slide vertically in the grooves. The outer closure 19 is adapted to permanently close the lower portion of the opening 8 while the oven is in use and is provided with a lug extension 24 which engages the oven casing and holds the closure in operative position. The inner closure 21 is adapted to be moved vertically to close more or less of the upper portion of the oven opening, and means are provided whereby the inner closure may be raised and lowered simultaneously with the broiling rack and whereby the said closure may be moved at will independently of the broiling rack into position to completely close the upper portion of the oven opening. The means for operating the inner closure with the broiling rack consists of lugs 25 extending inwardly from the inner closure in position to rest upon lugs 26 on the rack, so that the closure will be raised and lowered as the rack is moved upwardly or downwardly. The closure 21 may at any time be lifted clear of the rack by a handle 27 and positioned upon the closure 19 so as to completely close the oven entrance as shown in Fig. 4. The front walls of the grooves are provided with upper and lower notches 28 and 29 respectively, through which the lugs 23 may be withdrawn thereby permitting the closures 19 and 21 to be removed. When the closures are in the position shown in Fig. 4, the upper closures may be raised a slight distance to move its upper lugs 23 outwardly through the slots 28, whereupon a slight further upward movement will permit the lower lugs 23 to be moved outwardly through the slots 28 thereby freeing the closure. In a similar manner the outer closure 19 may be removed by raising it and withdrawing its lugs 23 through the slots 29.

When food is to be placed on or removed from the broiling rack, the rack is usually lowered to the position shown in Fig. 2. It is apparent that while free access is afforded to the oven above the broiling rack, the entrance to the oven below the rack is closed, thereby preventing unheated air from entering this portion of the oven. After the broil has been placed on the rack the same may be raised by the operator into the desired proximity to the burners as shown in Fig. 3. The upward movement of the rack correspondingly raises the upper closure 21 thereby maintaining the entrance to the oven below the broiling rack entirely closed. Thus, where the service is steady and it is desired to broil quickly, the operator need pay no attention to closing and opening doors or closures to the oven, but may at all times see the condition of the broil and have direct access thereto. At the same time the oven is closed, except for the small opening immediately below the burners, so that cooling of the oven by the entrance of cold air is prevented. In the intervals between the usage of the oven or immediately after a fresh broil has been placed on the rack the inner closure may be raised to the position shown in Fig. 4 to completely close the oven opening, thereby retaining all of the heat in the oven. At any time the upper closure may be moved from its closed position by simply pushing its lower edge inwardly off of the top of the bottom closure, whereupon the closure will drop until its lugs 23 rest on the rack lugs 26. The rack may be then raised and lowered without attention to the closures as has been previously explained.

I claim:

1. The combination of a broiling oven having heating means arranged in the upper portion thereof, a broiling rack movable vertically in the oven below the heating means, the oven having an entrance opening extending above and below the broiling rack, and means for maintaining the entrance opening below the broiling rack closed while leaving the portion of the oven above the rack open.

2. The combination of a broiling oven having heating means at the upper portion thereof, a broiling rack mounted to move vertically in the oven, the oven having an entrance opening extending above and below the broiling rack, and collapsible means movable by said rack for closing the entrance to the oven below the broiling rack.

3. The combination of a broiling oven having heating means located at the upper portion thereof, a vertically movable broiling rack arranged in the oven below the heating means, the oven having an entrance opening extending above and below the broiling rack, and means movable vertically with the broiling rack for closing the entrance to the oven below said broiling rack.

4. The combination of a broiling oven having heating means, a broiling rack mounted to move vertically in the oven into and out of proximity to the heating means, the oven having an entrance opening extending above and below the broiling rack, means extending across the said opening for closing the same below the broiling rack, and means for moving said closing means vertically when the rack is so moved, said closing means being so mounted as to be detachable to permit access to the lower portion of the oven.

5. The combination of a broiling oven having burners arranged in the upper portion thereof, a broiling rack movable vertically in the oven below said burners, the oven having an entrance opening extending above and below the broiling rack, and means for closing the entrance to the oven below the broiling rack, said means being movable to close more or less of said entrance opening in accordance with the position of the broiling rack with respect to the burners.

6. The combination of a broiling oven having burners arranged in the upper portion thereof, a broiling rack movable vertically in the oven below said burners, the oven having an entrance opening extending above and below the broiling rack, and means for closing the entrance to the oven below the broiling rack, including means movable in the opening above the broiling rack for closing the upper portion of the said opening.

7. The combination of a broiling oven having heating means in the upper portion thereof, a broiling rack movable vertically in the oven into and out of proximity to the heating means, the oven having an entrance opening extending above and below the broiling rack, means for maintaining the entrance to the oven below the broiling rack closed and for closing at will the entrance to the oven above the broiling rack.

8. A combination of a broiling oven having heating means in the upper portion thereof, a broiling rack movable vertically in the oven into and out of proximity to the heating means, the oven having an entrance opening extending above and below the broiling rack, means for maintaining the entrance to the oven below the broiling rack closed irrespective of the vertical position of the broiling rack and for closing at will the entrance to the oven above the broiling rack.

9. The combination of a broiling oven having an entrance opening extending substantially from the bottom to the top of the oven chamber, a broiling rack movable vertically in the oven from a point therein above the bottom of said opening, means for closing the entrance opening, said closing means being arranged to close normally only that portion of the entrance opening disposed below the broiling rack, and means for moving the said closing means simultaneously with adjusting movements of the broiling rack, to vary the size of said entrance opening.

10. The combination with a broiling oven having an entrance opening extending substantially from the bottom to the top of the oven chamber, a broiling rack movable vertically in the oven from a point therein above the bottom of said opening, means for closing the entrance opening, arranged to close normally only that portion of the entrance opening disposed below the broiling rack, means for moving the said closing means with the boiling rack to vary the size of said entrance opening, said closing means being movable independently of the broiling rack to completely close said entrance opening.

11. The combination of a broiling oven having heating means therein, a broiling rack movable in the oven into and out of proximity to the heating means, the oven having an entrance opening extending above and below the broiling rack, means for closing the entrance opening, and a connection between the broiling rack and said closing means for moving the closing means upon movement of the broiling rack.

12. The combination of a broiling oven, a broiling rack movable vertically in the oven, the oven having an entrance opening extending above and below the broiling rack, a closure extending across the lower portion of the said opening, a second closure extending across the said opening and being movable vertically to close more or less of the remaining open portion of the opening, means for raising the second closure above the first named closure when the broiling rack is raised above the latter closure, the second named closure being movable independently of the broiling rack for further closing said entrance opening.

13. The combination of a broiling oven, a broiling rack movable vertically in the oven, the oven having an entrance opening extending above and below the broiling rack, a closure extending across the lower portion of the said opening, a second closure extending across the said opening and being mounted to move vertically to close more or less of the remaining open portion of the opening, and a connection between the second closure and the broiling rack for raising the second closure upon raising movement of the rack, said connection being adapted to permit the said second closure to be raised independently of the said rack.

14. The combination of an oven, a broiling rack movable vertically in the oven, the oven having an entrance opening extending above and below the broiling rack, a closure covering the lower portion of said entrance opening, mounted on vertical ways at the sides of said opening, a second closure mounted on vertical ways at the sides of said opening and being adapted to move above the first named closure, means detachably connecting the second closure with the broiling rack whereby the said second closure will be raised by raising movements of the rack and permitting the closure to be detached from the rack, said closures being removable from their mountings.

MICHAEL J. GREEN.

Witnesses:
W. H. GAFFNEY,
MABON P. ROPER.